US011073077B2

(12) United States Patent
Oshita

(10) Patent No.: US 11,073,077 B2
(45) Date of Patent: Jul. 27, 2021

(54) ELECTRIC SUPERCHARGER

(71) Applicant: KABUSHIKI KAISHA TOYOTA JIDOSHOKKI, Aichi-ken (JP)

(72) Inventor: Makio Oshita, Aichi-ken (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 41 days.

(21) Appl. No.: 16/606,497

(22) PCT Filed: Apr. 13, 2018

(86) PCT No.: PCT/JP2018/015490
§ 371 (c)(1),
(2) Date: Oct. 18, 2019

(87) PCT Pub. No.: WO2018/207550
PCT Pub. Date: Nov. 15, 2018

(65) Prior Publication Data
US 2020/0123968 A1   Apr. 23, 2020

(30) Foreign Application Priority Data

May 12, 2017   (JP) .............................. JP2017-095239

(51) Int. Cl.
*F02B 39/10* (2006.01)
*F02B 39/14* (2006.01)
(Continued)

(52) U.S. Cl.
CPC .............. *F02B 39/10* (2013.01); *F01D 25/12* (2013.01); *F02B 39/14* (2013.01); *F04D 29/059* (2013.01); *F04D 29/06* (2013.01)

(58) Field of Classification Search
CPC .......... F02B 39/10; F02B 39/14; F02B 39/16; F01D 25/12; F04D 29/059; F04D 29/06
(Continued)

(56) References Cited

U.S. PATENT DOCUMENTS 4,884,406 A * 12/1989 Kawamura ............. F02B 39/10
60/605.3
5,605,045 A *  2/1997 Halimi .................... F02B 39/10
60/607
(Continued)

FOREIGN PATENT DOCUMENTS

DE     102013109136        2/2014
JP        2003293785 A  * 10/2003  .............. F02B 39/10
(Continued)

OTHER PUBLICATIONS

Official Communication issued in International Bureau of WIPO Patent Application No. PCT/JP2018/0015490, dated Jun. 12, 2018 (with English translation).

*Primary Examiner* — Thai Ba Trieu
(74) *Attorney, Agent, or Firm* — Greenblum & Bernstein, P.L.C.

(57) ABSTRACT

An electric supercharger includes a housing, a rotary shaft rotatably supported in the housing via a rolling bearing, an impeller, and an electric motor. The electric motor including a cylindrical stator around which a coil is wound. The stator having a stator core and coil ends. The rolling bearing has an inner ring, an outer ring, and a rolling element. The housing has an oil supply portion. The oil supply portion has attached thereto an oil supply member. The oil supply member has a supply passage and an injection hole. The housing has therethrough oil supply holes communicating with the oil supply portion and disposed so as to overlap with the coil ends.

3 Claims, 3 Drawing Sheets

(51) Int. Cl.
*F01D 25/12* (2006.01)
*F04D 29/05* (2006.01)
*F04D 29/06* (2006.01)
*F04D 29/059* (2006.01)

(58) Field of Classification Search
USPC ......... 60/605.3, 607–609; 417/407; 184/6.11
See application file for complete search history.

(56) References Cited

U.S. PATENT DOCUMENTS

| | | | |
|---|---|---|---|
| 7,360,361 B2 * | 4/2008 | Prusinski | F02B 39/10 60/608 |
| 7,946,118 B2 * | 5/2011 | Hippen | F02B 39/10 60/605.3 |
| 8,001,781 B2 * | 8/2011 | Shibui | F02B 39/10 60/605.3 |
| 2009/0194044 A1 | 8/2009 | Nishida | |
| 2009/0233129 A1 | 9/2009 | Ojima et al. | |
| 2013/0220285 A1 | 8/2013 | Hayashi et al. | |
| 2014/0056726 A1 | 2/2014 | Garrard et al. | |
| 2015/0275715 A1 | 10/2015 | Nagata et al. | |
| 2016/0153462 A1 | 6/2016 | Oda et al. | |
| 2019/0288576 A1 | 9/2019 | Oshita et al. | |
| 2020/0011233 A1 | 1/2020 | Oshita | |

FOREIGN PATENT DOCUMENTS

| | | | | |
|---|---|---|---|---|
| JP | 2006-9685 | | 1/2006 | |
| JP | 2007309101 A | * | 11/2007 | ............. F02B 39/14 |
| JP | 2008-63974 | | 3/2008 | |
| JP | 2008-63991 | | 3/2008 | |
| JP | 2008095650 A | * | 4/2008 | ............. F02B 39/14 |
| JP | 2008-121477 | | 5/2008 | |
| JP | 2008128112 A | * | 6/2008 | ............. F02B 39/10 |
| JP | 2012-102700 | | 5/2012 | |
| JP | 2014-107887 | | 6/2014 | |
| JP | 2015-17538 | | 1/2015 | |

* cited by examiner

ELECTRIC SUPERCHARGER

CROSS-REFERENCE TO RELATED APPLICATIONS

This application is a National Stage of International Application No. PCT/JP2018/015490 filed Apr. 13, 2018, claiming priority based on Japanese Patent Application No. 2017-095239 filed May 12, 2017, the contents of each application being herein incorporated by reference in its entirety.

TECHNICAL FIELD

The present invention relates to an electric supercharger that rotates an impeller with rotation of a rotary shaft by driving an electric motor.

BACKGROUND ART

For example, an electric supercharger described in Patent Document 1, in which a damper unit that absorbs shaft vibration is mounted in an end of a rotary shaft, has been known as a conventional electric supercharger. In this electric supercharger, the rotary shaft is rotatably supported in a housing, for example, via a rolling bearing. An impeller is connected to one end side of the rotary shaft in an axial direction of the rotary shaft. The housing accommodates an electric motor rotating a rotary shaft. The housing also has an intake port through which fluid is flown in, an impeller chamber that communicates with the intake port and accommodates the impeller, a discharge chamber into which fluid compressed by the impeller is discharged, and a diffuser passage providing communication between the impeller chamber and the discharge chamber.

When rotating the rotary shaft by driving the electric motor, the impeller rotates and generates centrifugal force, which gives kinetic energy to fluid sucked in through the intake port. The fluid at a high speed by obtaining the kinetic energy is decelerated through a diffuser passage disposed in an outlet of the impeller, thereby converting kinetic energy into pressure energy of the fluid. The fluid having high pressure is discharged from the discharge chamber.

CITATION LIST

Patent Document

Patent Document 1: Japanese Patent Application Publication No. 2012-102700

SUMMARY OF INVENTION

Technical Problem

By the way, a rolling bearing supporting a rotary shaft of an electric supercharger easily has a higher temperature by rotation of the rotary shaft at a high speed, thereby causing seizure of the rolling bearing in case of insufficient lubrication of the rolling bearing. Thus, it is required that the rolling bearing is lubricated and cooled down by supplying lubrication oil to a space between an inner ring and an outer ring of the rolling bearing. However, the configuration described in the Patent Document 1, in which a supply passage of lubrication oil is provided by processing a housing of the electric supercharger, has an issue that the configuration needs a lot of work for fine processing of the housing, thereby increasing costs of manufacturing the electric supercharger. Accordingly, lubrication oil supply mechanism configured to supply lubrication oil efficiently to the space between the inner ring and the outer ring of the rolling bearing has been required. In addition, a coil of an electric motor has been required to cool down efficiently because the coil generates heat and easily has a high temperature.

It is an objective of the present invention to provide an electric supercharger that efficiently supplies lubrication oil to a space between an inner ring and an outer ring of a rolling bearing, and furthermore, efficiently cools down a coil of an electric motor.

Solution to Problem

To achieve the foregoing objective and in accordance with one aspect of the present invention, an electric supercharger includes a housing, a rotary shaft rotatably supported in the housing via a rolling bearing, an impeller connected to a first end side of the rotary shaft in an axial direction thereof, and an electric motor rotating the rotary shaft and accommodated in the housing. The electric motor includes a cylindrical stator around which a coil is wound. The stator has a stator core and coil ends which each form a part of the coil and extend from opposite end surfaces of the stator core located in the axial direction of the rotary shaft. The rolling bearing has an inner ring fixed to the rotary shaft, an outer ring disposed outside the inner ring, and a rolling element interposed between the inner ring and the outer ring. The housing has an oil supply portion to which lubrication oil is supplied, and disposed above the electric motor in the gravity direction. The oil supply portion has attached thereto an oil supply member which has a pipe-like shape, disposed in a space between the electric motor and the housing in the axial direction of the rotary shaft. The oil supply member has a supply passage communicating with the oil supply portion and extending in an axial direction of the oil supply member through the oil supply member, and an injection hole communicating with the supply passage and from which the lubrication oil is injected to the space between the inner ring and the outer ring of the rolling bearing. The housing has therethrough oil supply holes communicating with the oil supply portion and disposed so as to overlap with the coil ends in a radial direction of the rotary shaft.

With this configuration, lubrication oil in the oil supply portion is injected from the injection hole to the space between the inner ring and the outer ring through the supply passage. This configuration efficiently supplies lubrication oil to the space between the inner ring and the outer ring, as compared to the case in which, for example, lubrication oil is supplied to an outer circumferential surface of the outer ring and then flows into the space between the inner ring and the outer ring. In addition, lubrication oil in the oil supply portion is supplied to the coil ends through the oil supply holes, so that the coil ends are cooled down by lubrication oil. Therefore, this efficiently cools down the coil of the electric motor, for example, as compared to the case in which the coil of the electric motor is cooled down by a water cooling system.

In the above-described electric supercharger, it is preferable that a size of each of the oil supply holes is increased as extending from the oil supply portion toward the coil end. With this configuration, lubrication oil is easily supplied to the coil ends from the oil supply portion through the oil supply holes, further easily cooling down the coil ends, that is, further efficiently cooling down the coil of the electric motor.

Advantageous Effects of Invention

According to the present invention, in the electric supercharger, it is possible to supply lubrication oil efficiently to the space between the inner ring and the outer ring of the rolling bearing supporting the rotary shaft, and furthermore, to cool down the coil of the electric motor efficiently.

DESCRIPTION OF EMBODIMENTS

An electric supercharger according to an embodiment of the present invention will now be described with reference to FIGS. 1 to 3. The electric supercharger of the present embodiment is mounted in an engine compartment of a vehicle, and used to compress air corresponding to fluid and supply the air to an engine.

Figure 1:
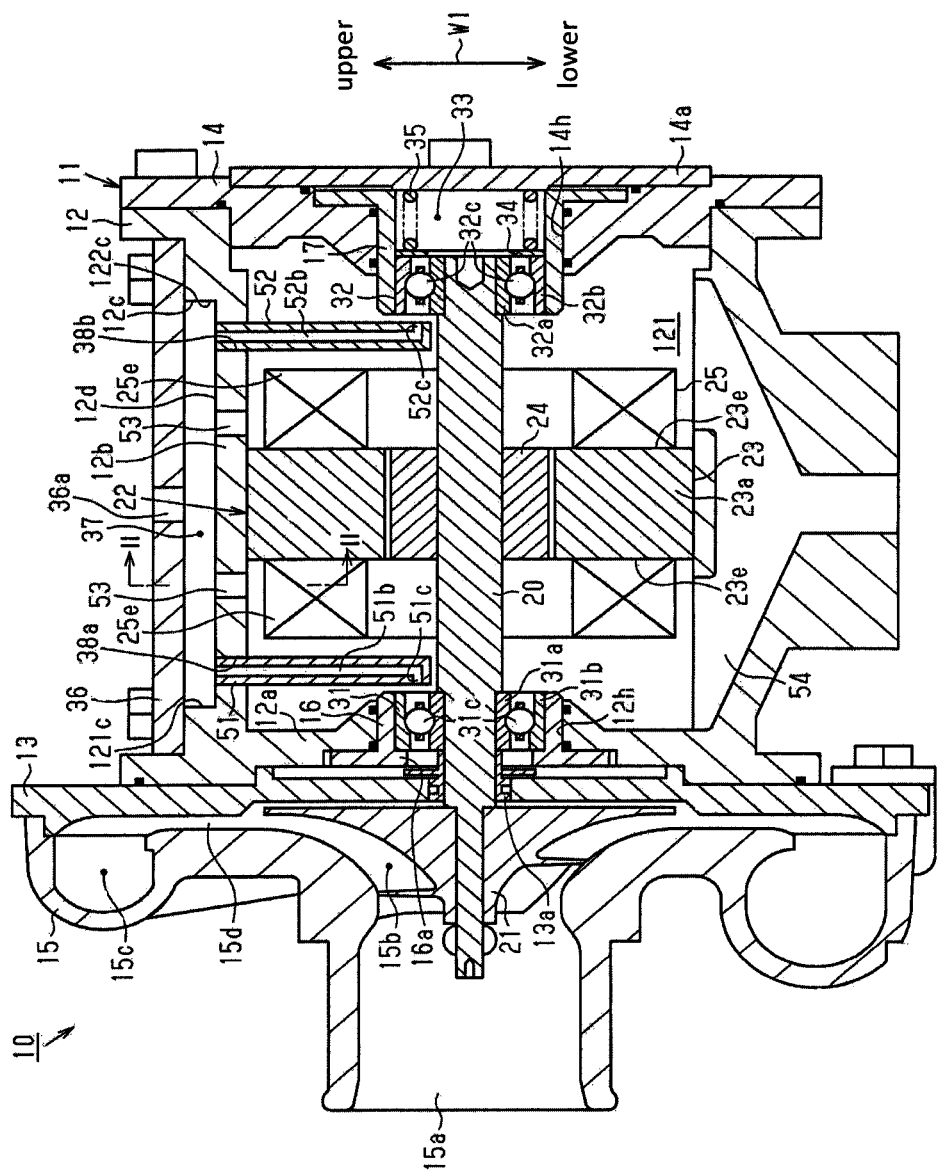
FIG. 1 is a longitudinal sectional view of an electric supercharger according to an embodiment of the present invention.

Referring to FIG. 1, a housing 11 of an electric supercharger 10 includes a bottomed cylindrical motor housing 12 having a disk-like bottom wall 12a and a circumferential wall 12b cylindrically extending from the bottom wall 12a. The housing 11 also includes a first disk-like seal plate 13, a second disk-like seal plate 14, and a cover 14a. The first seal plate 13 is connected to an outer surface of the bottom wall 12a of the motor housing 12. The second seal plate 14 is connected to an opening of the circumferential wall 12b of the motor housing 12. The cover 14a is attached to the second seal plate 14. In addition, the housing 11 includes a compressor housing 15 connected to the first seal plate 13 on the opposite side from the motor housing 12. The motor housing 12, the first seal plate 13, the second seal plate 14, the cover 14a, and the compressor housing 15 are, for example, made of aluminum.

The bottom wall 12a of the motor housing 12 has therethrough a first through hole 12h. In the first through hole 12h, a cylindrical first bearing case 16 is attached. The first bearing case 16 is made of iron. The first bearing case 16 has an annular engagement portion 16a protruding from an inner circumferential surface of the first bearing case 16.

The second seal plate 14 has therethrough a second through hole 14h. In the second through hole 14h, a cylindrical second bearing case 17 is attached. The second bearing case 17 is made of iron. The cover 14a covers an opening of the second through hole 14h on the opposite side from the motor housing 12.

The electric supercharger 10 includes a rotary shaft 20 rotatably supported in the housing 11. The rotary shaft 20 extends from the inside of the second bearing case 17 to the inside of the compressor housing 15 through the motor housing 12, the first bearing case 16, and the first seal plate 13. A seal member 13a, which is a labyrinth seal, is interposed between the rotary shaft 20 and the first seal plate 13.

In the present embodiment, an end side of the rotary shaft 20 extending to the inside of the compressor housing 15 and an end side of the rotary shaft 20 fitted to the second bearing case 17 correspond to the first end side and the second end side of the rotary shaft 20 in an axial direction thereof, respectively. An impeller 21 is connected to the first end side of the rotary shaft 20 in the axial direction thereof.

An electric motor 22 rotating the rotary shaft 20 is accommodated in the motor housing 12. Specifically, the electric motor 22 is accommodated in a motor chamber 121 that is defined by the bottom wall 12a and the circumferential wall 12b of the motor housing 12, and the second seal plate 14.

The electric motor 22 includes a cylindrical stator 23 and a rotor 24 disposed inside the stator 23. A coil 25 is wound around the stator 23. When current is supplied to the coil 25, the rotor 24 is integrally rotated with the rotary shaft 10.

The stator 23 has a stator core 23a fixed to an inner circumferential surface of the circumferential wall 12b of the motor housing 12 and coil ends 25e each extending from opposite end surfaces 23e of the stator core 23a located in the axial direction of the rotary shaft 20. The coil ends 25e each form a part of the coil 25.

The electric supercharger 10 includes a first rolling bearing 31 corresponding to the rolling bearing that rotatably supports a portion of the rotary shaft 20 located closer to the impeller 21 in the axial direction of the rotary shaft 20. The first rolling bearing 31 is accommodated in the first bearing case 16.

The first rolling bearing 31 is an angular contact ball bearing, and has a first inner ring 31a as the inner ring fixed to the rotary shaft 20, a first outer ring 31b as the outer ring disposed outside the first inner ring 31a, and first balls 31c as the rolling elements interposed between the first inner ring 31a and the first outer ring 31b. The rotary shaft 20 is press-fitted to the first inner ring 31a. The first outer ring 31b is press-fitted to the inner circumferential surface of the first bearing case 16.

The electric supercharger 10 includes a second rolling bearing 32 corresponding to the rolling bearing that rotatably supports a portion of the rotary shaft 20 located farther from the impeller 21 than the first rolling bearing 31 in the axial direction of the rotary shaft 20. With this configuration, the rotary shaft 20 is rotatably supported in the housing 11 via the first rolling bearing 31 and the second rolling bearing 32. The second rolling bearing 32 is accommodated in the second bearing case 17, and disposed in an end of the second bearing case 17 opposed to the cover 14a inside the second bearing case 17 in the axial direction of the rotary shaft 20.

The second rolling bearing 32 is an angular contact ball bearing, and has a second inner ring 32a as the inner ring fixed to the rotary shaft 20, a second outer ring 32b as the outer ring disposed outside the second inner ring 32a, and second balls 32c as the rolling elements interposed between the second inner ring 32a and the second outer ring 32b. The rotary shaft 20 is press-fitted to the second inner ring 32a. The second outer ring 32b is fitted to an inner circumferential surface of the second bearing case 17 by clearance fit.

The second bearing case 17 has an accommodation chamber 33 located between the second rolling bearing 32 and the cover 14a in the axial direction of the rotary shaft 20. The accommodation chamber 33 accommodates an annular washer 34 and a preload spring 35.

A first end of the preload spring 35 is in contact with the cover 14a and a second end of the preload spring 35 is in contact with an end surface of the second outer ring 32b of the second rolling bearing 32 via the washer 34. The preload spring 35, which is compressed in the axial direction of the rotary shaft 20, is interposed between the cover 14a and the washer 34. This means that the cover 14a holds the preload spring 35. The preload spring 35 urges the second rolling bearing 32 in the axial direction of the rotary shaft 20 by force that restores the preload spring 35, which is compressed, to an original form thereof.

The urging force of the preload spring 35 is transmitted to the second outer ring 32b via the washer 34, and subsequently, transmitted to the second inner ring 32a via the second balls 32c. Thus, the second inner ring 32a is pushed toward the impeller 21 in the axial direction of the rotary shaft 20. Then, the urging force of the preload spring 35 is transmitted from the second inner ring 32a to the rotary shaft 20, so that the rotary shaft 20 is to move toward the impeller 21 in the axial direction of the rotary shaft 20. The rotary shaft 20 is in contact with the first inner ring 31a of the first rolling bearing 31. The first balls 31c are pushed by the first inner ring 31a toward impeller 21 in the axial direction of the rotary shaft 20, pushing the first outer ring 31b. Therefore, the first outer ring 31b is pushed by the first balls 31c, thereby being in contact with the engagement portion 16a of the first bearing case 16.

In the electric supercharger 10, during the rotation of the impeller 21, the impeller 21 generates axial thrust that pulls the rotary shaft 20 in the direction from the second rolling bearing 32 toward the first rolling bearing 31 in the axial direction of the rotary shaft 20. The first rolling bearing 31 and the second rolling bearing 32 rotatably support the rotary shaft 20 while receiving the thrust force via the rotary shaft 20.

The compressor housing 15 has an intake port 15a through which air (fresh air) is sucked in, an impeller chamber 15b that communicates with the intake port 15a and accommodates the impeller 21, the discharge chamber 15c into which air compressed by the impeller 21 is discharged, and the diffuser passage 15d providing communication between the impeller chamber 15b and the discharge chamber 15c.

When rotating the rotary shaft 20 by driving the electric motor 22, the impeller 21 rotates and generates centrifugal force, which gives kinetic energy to air sucked in through the intake port 15a. The air at a high speed by obtaining the kinetic energy is decelerated by passing through the diffuser passage 15d disposed in an outlet of the impeller 21, thereby converting kinetic energy into pressure energy of the air. The air having high pressure is discharged from the discharge chamber 15c and supplied to the engine (not shown).

The outer circumferential surface of the circumferential wall 12b of the motor housing 12 has a recess portion 12c in part. A bottom surface 12d of the recess portion 12c is formed in a flat surface shape. The recess portion 12c extends in the axial direction of the rotary shaft 20. A first edge 121c of the recess portion 12c in the axial direction of the rotary shaft 20 is overlapped with the first rolling bearing 31 in a radial direction of the rotary shaft 20. A second edge 122c of the recess portion 12c in the axial direction of the rotary shaft 20 is overlapped with the second rolling bearing 32 in the radial direction of the rotary shaft 20.

A cover member 36 is attached to an outer circumferential surface of the motor housing 12 to cover the recess portion 12c. The cover member 36 and the recess portion 12c cooperate to define an oil supply portion 37 that is a space to which lubrication oil is supplied. In other words, in the present embodiment, the housing 11 has the oil supply portion 37 to which lubrication oil is supplied. The oil supply portion 37 is disposed above the electric motor 22 in the gravity direction W1.

The bottom surface 12d of the recess portion 12c has a first mounting hole 38a and a second mounting hole 38b. The first mounting hole 38a and the second mounting hole 38b are formed so as to pass through the circumferential wall 12b. The first mounting hole 38a and the second mounting hole 38b are disposed closer to the first edge 121c and the second edge 122c of the recess portion 12c, respectively. The first mounting hole 38a is disposed to overlap in the radial direction of the rotary shaft 20 with a space between the electric motor 22 and the bottom wall 12a of the motor housing 12 in the axial direction of the rotary shaft 20. The second mounting hole 38b is disposed to overlap in the radial direction of the rotary shaft 20 with a space between the electric motor 22 and the second seal plate 14 in the axial direction of the rotary shaft 20.

The cover member 36 has a supply port 36a through which lubrication oil is supplied to the oil supply portion 37. The supply port 36a is overlapped in the radial direction of the rotary shaft 20 with a portion of the bottom surface 12d of the recess portion 12c interposed between the first mounting hole 38a and the second mounting hole 38b in the axial direction of the rotary shaft 20. A part of engine oil as the lubrication oil is supplied to the supply port 36a.

The oil supply portion 37 (the motor housing 12) has attached thereto a first oil supply member 51 as the pipe-like oil supply member. The first oil supply member 51 extends linearly. The first oil supply member 51 is attached to the motor housing 12 by press-fitting an end of the first oil supply member 51 near the oil supply portion 37 to the first mounting hole 38a. The first oil supply member 51 extends into the space between the electric motor 22 and the bottom wall 12a of the motor housing 12 in the motor chamber 121 in the axial direction of the rotary shaft 20. In other words, the first oil supply member 51 is disposed in the space between the electric motor 22 and the bottom wall 12a of the motor housing 12 in the axial direction of the rotary shaft 20. The first oil supply member 51 extends in the radial direction of the rotary shaft 20.

The first oil supply member 51 has a first supply passage 51b as the supply passage extending therethrough in an axial direction of the first oil supply member 51. An end of the first supply passage 51b near the oil supply portion 37 communicates with the oil supply portion 37, and the first supply passage 51b extends in the radial direction of the rotary shaft 20. The first oil supply member 51 further has a first injection hole 51c as the injection hole communicating with the first supply passage 51b and from which the lubrication oil is injected to an space between the first inner ring 31a and the first outer ring 31b of the first rolling bearing 31. The first injection hole 51c extends in the axial direction of the rotary shaft 20, and opens in an outer circumferential surface of an end of the first oil supply member 51 on the opposite side from the oil supply portion 37 in the axial direction of the first oil supply member 51. The first injection hole 51c faces a part of the space between the first inner ring 31a and the first outer ring 31b in the axial direction of the rotary shaft 20. A flow passage cross-sectional area of the first injection hole 51c is smaller than that of the first supply passage 51b.

The oil supply portion 37 (the motor housing 12) has a second oil supply member 52 as the pipe-like oil supply member. The second oil supply member 52 extends linearly. The second oil supply member 52 is attached to the motor housing 12 by press-fitting an end of the second oil supply member 52 near the oil supply portion 37 to the second mounting hole 38b. The second oil supply member 52 extends into the space between the electric motor 22 and the second seal plate 14 in the motor chamber 121 in the axial direction of the rotary shaft 20. In other words, the second oil supply member 52 is disposed in the space between the electric motor 22 and the second seal plate 14 in the axial direction of the rotary shaft 20. The second oil supply member 52 extends in the radial direction of the rotary shaft 20.

The second oil supply member 52 has therethrough a second supply passage 52b as the supply passage extending in an axial direction of the second oil supply member 52. An end of the second supply passage 52b near the oil supply portion 37 communicates with the oil supply portion 37, and the second supply passage 52b extends in the radial direction of the rotary shaft 20. The second oil supply member 52 further has a second injection hole 52c as the injection hole communicating with the second supply passage 52b and from which the lubrication oil is injected to a space between the second inner ring 32a and the second outer ring 32b of the second rolling bearing 32. The second injection hole 52c extends in the axial direction of the rotary shaft 20, and opens in an outer circumferential surface of an end of the second oil supply member 52 on the opposite side from the oil supply portion 37 in the axial direction of the second oil supply member 52. The second injection hole 52c faces a part of the space between the second inner ring 32a and the second outer ring 32b in the axial direction of the rotary shaft 20. A flow passage cross-sectional area of the second injection hole 52c is smaller than that of the second supply passage 52b.

The circumferential wall 12b of the motor housing 12 has therethrough two oil supply holes 53 communicating with the oil supply portion 37. The oil supply holes 53 are formed in the bottom surface 12d of the recess portion 12c. The oil supply holes 53 pass through the circumferential wall 12b. The two oil supply holes 53 are disposed in a space between the first mounting hole 38a and the second mounting hole 38b in the axial direction of the rotary shaft 20. The oil supply holes 53 are disposed so as to overlap with the coil ends 25e in the radial direction of the rotary shaft 20.

Figure 2:
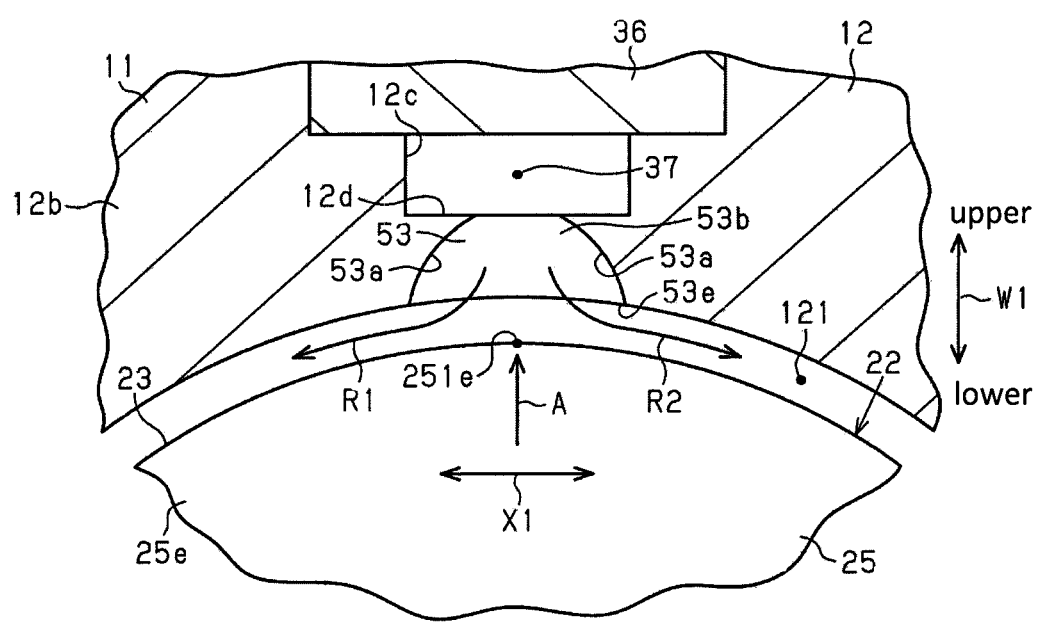
FIG. 2 is a cross-sectional view of the electric supercharger taken along line II-II of FIG. 1.
Figure 3:
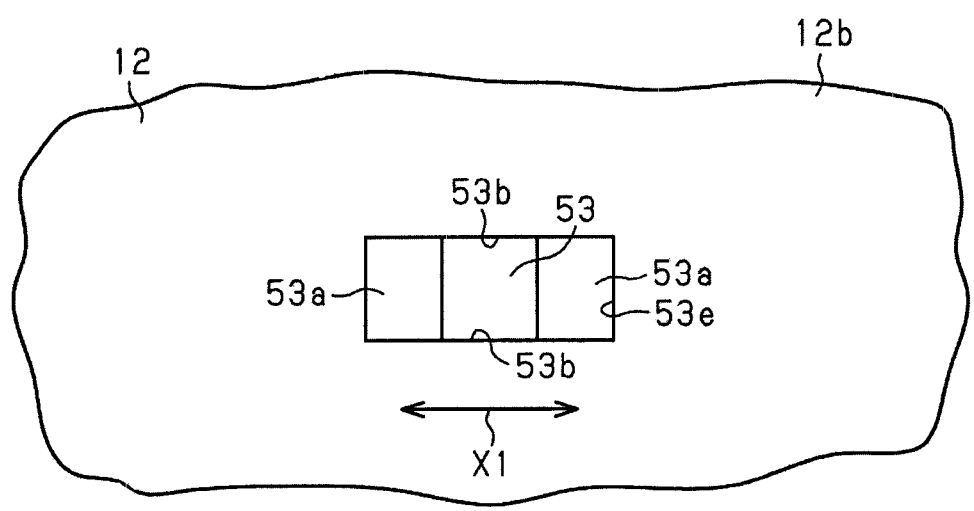
FIG. 3 is a view of the electric supercharger as indicated by arrow A of FIG. 2.

Referring to FIG. 2 and FIG. 3, a size of each oil supply hole 53 is increased as extending from the oil supply portion 37 toward the coil end 25e. Referring to FIG. 2, an inner face of each oil supply hole 53 has a pair of opposite surfaces 53a that bends archwise as viewed in a cross-section in a direction perpendicular to the axial direction of the rotary shaft 20. The pair of opposite surfaces 53a faces each other in a circumferential direction of the coil end 25e (a circumferential direction of the rotary shaft 20). The pair of opposite surfaces 53a bends archwise so as to cooperate to form a recess in an opposite direction X1 of the pair of opposite surfaces 53a. The pair of opposite surfaces is distanced from each other, as extending from the oil supply portion 37 toward the coil end 25e.

Each oil supply hole 53 is disposed so as to overlap with a top 251e of each coil end 25e in the radial direction of the rotary shaft 20. The top 251e of the coil end 25e is an uppermost portion of the coil end 25e in the gravity direction W1. An opening 53e of each oil supply hole 53 near the coil end 25e extends toward the opposite sides of the coil end 25e in the circumferential direction of thereof relative to the top 251e of each coil end 25e.

Referring to FIG. 3, the oil supply holes 53 are each formed in a rectangular hole shape in a plan view. Both inner faces 53b of the oil supply hole 53 are located in a direction perpendicular to the opposite direction X1 of the pair of opposite surfaces 53a, and extend parallel to each other in a plan view.

Referring to FIG. 1, a discharge passage 54 through which lubrication oil in the motor chamber 121 is discharged to the outside of the housing 11 is formed in a lower portion of the circumferential wall 12b of the motor housing 12 in the gravity direction. The lubrication oil discharged to the outside of the housing 11 through the discharge passage 54 is recovered to an oil pan of the engine as engine oil.

The following will describe an operation of the present embodiment.

The lubrication oil supplied to the oil supply portion 37 from the supply port 36a and filled in the oil supply portion 37 separately flows into the first supply passage 51b of the first oil supply member 51 and the second supply passage 52b of the second oil supply member 52. The lubrication oil separately flown into the first supply passage 51b and the second supply passage 52b passes through the first supply passage 51b and the second supply passage 52b, respectively.

The lubrication oil passing through the first supply passage 51b is injected into the space between the first inner ring 31a and the first outer ring 31b from the first injection hole 51c. The flow passage cross-sectional area of the first injection hole 51c is smaller than that of the first supply passage 51b. With this configuration, lubrication oil is then throttled through the first injection hole 51c and dynamically injected to the space between the first inner ring 31a and the first outer ring 31b from the first injection hole 51c. This means that lubrication oil is efficiently supplied to the space between the first inner ring 31a and the first outer ring 31b, improving slidability between the first outer ring 31b and the first balls 31c, and between the first inner ring 31a and the first balls 31c.

The lubrication oil passing through the second supply passage 52b is injected into the space between the second inner ring 32a and the second outer ring 32b from the second injection hole 52c. The flow passage cross-sectional area of the second injection hole 52c is smaller than that of the second supply passage 52b. With this configuration, lubrication oil is then throttled through the second injection hole 52c and is dynamically injected to the space between the second inner ring 32a and the second outer ring 32b from the second injection hole 52c. This means that lubrication oil is efficiently supplied to the space between the second inner ring 32a and the second outer ring 32b, improving slidability between the second outer ring 32b and the second balls 32c, and between the second inner ring 32a and the second balls 32c.

In addition, lubrication oil in the oil supply portion 37 is supplied to the coil ends 25e through the oil supply holes 53. Referring to FIG. 2, the lubrication oil supplied to each coil end 25e branches in two directions along the shape of coil end 25e and flows downward along the circumferential portion of the coil end 25e. The size of each oil supply hole 53 is increased as extending from the oil supply portion 37 toward the coil end 25e. Therefore, as compared to the case in which each oil supply hole 53 has the constant size as extending from the oil supply portion 37 toward the coil end 25e, lubrication oil is then easily supplied to the coil ends 25e from the oil supply portion 37 through the oil supply holes 53.

The opening 53e of each oil supply hole 53 near the coil end 25e extends toward the opposite sides of the coil end 25e in the circumferential direction thereof relative to the top 251e of the coil end 25e. With this configuration, after lubrication oil flowing out from each oil supply hole 53 is supplied to the vicinity of the top 251e of the coil end 25e, relative to the top 251e of the coil end 25e, lubrication oil flows to the opposite sides of the coil end 25e in the circumferential direction thereof, and easily flows along the circumferential portion of the coil end 25e as indicated by arrows R1 and R2 in FIG. 2. Therefore, lubrication oil cools down an entirety of each of the coil ends 25e, that is, the coil 25 of the electric motor 22.

The above-embodiment provides the following advantages.

(1) Lubrication oil in the oil supply portion 37 is injected to the space between the first inner ring 31a and the first outer ring 31b from the first injection hole 51c through the first supply passage 51b and the space between the second inner ring 32a and the second outer ring 32b from the second injection hole 52c through the second supply passage 52b. For example, lubrication oil is supplied to the outer circumferential surfaces of the first outer ring 31b and the second outer ring 32b and then flows into the spaces between the first inner ring 31a and the first outer ring 31b and between the second inner ring 32a and the second outer ring 32b, respectively. As compared to this case, lubrication oil is efficiently supplied to the spaces between the first inner ring 31a and the first outer ring 31b, and between the second inner ring 32a and the second outer ring 32b. In addition, lubrication oil in the oil supply portion 37 is supplied to the coil ends 25e through the oil supply holes 53, so that the coil ends 25e are cooled down by lubrication oil. This efficiently cools down the coil 25 of the electric motor 22, for example, as compared to the case in which the coil 25 of the electric motor 22 is cooled down by a water cooling system.

(2) The size of each oil supply hole 53 is increased as extending from the oil supply portion 37 toward each coil end 25e. With this configuration, lubrication oil is easily supplied to the coil ends 25e from the oil supply portion 37 through the oil supply holes 53, further cooling down the coil ends 25e, that is, further efficiently cooling down the coil 25 of the electric motor 22.

(3) The flow passage cross-sectional areas of the first injection hole 51c and the second injection hole 52c are smaller than those of the first supply passage 51b and the second supply passage 52b. With this configuration, lubrication oil flowing from the oil supply portion 37 through the first supply passage 51b and the second supply passage 52b is throttled through the first injection hole 51c and the second injection hole 52c, and dynamically injected into the spaces between the first inner ring 31a and the first outer ring 31b and between the second inner ring 32a and the second outer ring 32b from the first injection hole 51c and the second injection hole 52c. Therefore, the lubrication oil is further efficiently supplied to the spaces between the first inner ring 31a and the first outer ring 31b and between the second inner ring 32a and the second outer ring 32b.

(4) The opening 53e of each oil supply hole 53 near the coil end 25e extends toward the opposite sides of the coil end 25e in the circumferential direction thereof relative to the top 251e of the coil end 25e. With this configuration, lubrication oil supplied to coil ends 25e from the oil supply portion 37 through oil supply holes 53 flows to the opposite sides of the coil end 25e in the circumferential direction thereof relative to the top 251e of the coil end 25e, and easily flows along the circumferential portion of the coil end 25e. Therefore, lubrication oil efficiently cools down an entirety of each of the coil ends 25e, that is, the coil 25 of the electric motor 22.

(5) The oil supply portion 37 is a space to which lubrication oil flowing through the first oil supply member 51 and the second oil supply member 52 is supplied, and also a space to which lubrication oil flowing through the oil supply holes 53 is supplied. Accordingly, this simplifies a configuration of the housing 11 as compared to the case in which the space to which lubrication oil flowing through the first oil supply member 51 and the second oil supply member 52 is supplied is separate from the space to which lubrication oil flowing through the oil supply holes 53 is supplied.

The above embodiment may be modified as described below.

In the embodiment, each oil supply hole 53 may have the pair of opposite surfaces 53a, each of which is taper surface extending linearly in a cross-sectional view in the perpendicular direction to the axial direction of the rotary shaft 20.

In the embodiment, each oil supply hole 53 may be disposed so as not to overlap with the top 251e of the coil end 25e in the radial direction of the rotary shaft 20.

In the embodiment, the size of each oil supply hole 53 may be constant as extending from the oil supply portion 37 toward the coil end 25e.

In the embodiment, the housing 11 may have two oil supply holes 53 at positions overlapping with each coil end 25e in the radial direction of the rotary shaft 20.

In the embodiment, each oil supply hole 53 may be a circular hole shape in a plan view. The shape of the oil supply hole 53 is not particularly limited.

In the embodiment, the first oil supply member 51 and the second oil supply member 52 may be attached to the motor housing 12 so as to incline relative to the axial direction of the rotary shaft 20.

In the embodiment, the first injection hole 51c may open in a surface on the opposite from the oil supply portion 37 in the axial direction of the first oil supply member 51. Similar to the first injection hole 51c, the second injection hole 52c may open in a surface on the opposite from the oil supply portion 37 in the axial direction of the second oil supply member 52. In this case, the first oil supply member 51 and the second oil supply member 52 need to be attached to the motor housing 12 so as to incline relative to the axial direction of the rotary shaft 20. In addition, the first injection hole 51c needs to be disposed so as to face a part of the space between the first inner ring 31a and the first outer ring 31b, and the second injection hole 52c needs to be disposed so as to face a part of the space between the second inner ring 32a and the second outer ring 32b.

In the embodiment, the first oil supply member 51 and the second oil supply member 52 need not to extend linearly, and, for example, may be curved or be bent in an L-shape.

In the embodiment, the first oil supply member 51 and the second oil supply member 52 may be attached to the inner circumferential surface of the circumferential wall 12b of the motor housing 12, for example, with the fixing member such as a bolt.

In the embodiment, the flow passage cross-sectional areas of the first injection hole 51c and the second injection hole 52c may be the same flow passage cross-sectional areas as those of the first supply passage 51b and the second supply passage 52b, and may be larger than those of the first supply passage 51b and the second supply passage 52b.

In the embodiment, the first rolling bearing 31 and the second rolling bearing 32 may be, for example, roller bearings which rolling elements each have a cylindrical shape.

In the embodiment, only one of a first bearing or a second bearing may be a rolling bearing in the electric supercharger 10. The first bearing rotatably supports the rotary shaft 20 in a position closer to the impeller 21 in the axial direction of the rotary shaft 20. The second bearing rotatably supports the rotary shaft 20 in a position farther from the impeller 21 than the first bearing in the axial direction of the rotary shaft 20. The oil supply member may be provided so as to correspond to either rolling bearing of the first bearing or the second bearing, namely, two oil supply members are not provided as illustrated in FIG. 1, only one oil supply member may be provided in the electric supercharger 10.

REFERENCE SIGNS LIST 10 electric supercharger
11 housing
20 rotary shaft
21 impeller
22 electric motor
23 stator
23a stator core
23e end surface
25 coil
25e coil end
31 first rolling bearing corresponding to the rolling bearing
31a first inner ring corresponding to the inner ring
31b first outer ring corresponding to the outer ring
31c first ball corresponding to the rolling element
32 second rolling bearing corresponding to the rolling bearing
32a second inner ring corresponding to the inner ring
32b second outer ring corresponding to the outer ring
32c second ball corresponding to the rolling element
37 oil supply portion
51 first oil supply member corresponding to the oil supply member
51b first supply passage corresponding to the supply passage
51c first injection hole corresponding to the injection hole
52 second oil supply member corresponding to the oil supply member
52b the second supply passage corresponding to the supply passage
52c the second injection hole corresponding to the injection hole
53 oil supply hole

The invention claimed is:
1. An electric supercharger comprising:
a housing;
a rotary shaft rotatably supported in the housing via a rolling bearing;
an impeller connected to a first end side of the rotary shaft in an axial direction thereof; and
an electric motor rotating the rotary shaft and accommodated in the housing;
wherein the electric motor includes a cylindrical stator around which a coil is wound;
wherein the cylindrical stator has a stator core and coil ends which each forms a part of the coil and extend from opposite end surfaces of the stator core located in the axial direction of the rotary shaft;
wherein the rolling bearing has an inner ring fixed to the rotary shaft, an outer ring disposed outside the inner ring, and a rolling element interposed between the inner ring and the outer ring;
wherein the housing has an oil supply portion to which lubrication oil is supplied, and disposed above the electric motor in a gravity direction;
wherein the oil supply portion has attached thereto an oil supply pipe which has a pipe-like shape, disposed in a space between the electric motor and the housing in the axial direction of the rotary shaft;
wherein the oil supply pipe has:
a supply passage communicating with the oil supply portion and extending in an axial direction of the oil supply pipe through the oil supply pipe; and
an injection hole communicating with the supply passage and from which the lubrication oil is injected to a space between the inner ring and the outer ring of the rolling bearing;
wherein the housing has therethrough oil supply holes communicating with the oil supply portion and disposed so as to overlap with the coil ends in a radial direction of the rotary shaft; and
wherein each of the oil supply holes includes an opening with a size that is increased as extending from the oil supply portion toward a respective one of the coil ends, and simultaneously, the size of the opening is increased in a direction extending toward opposite sides of the respective one of the coil ends.

2. The electric supercharger according to claim 1, wherein the oil supply pipe is attached to the housing by press-fitting.

3. The electric supercharger according to claim 1, wherein the injection hole from which the lubrication oil is injected faces the rolling bearing in the axial direction of the rotary shaft.

* * * * *